(12) United States Patent
Nakamura et al.

(10) Patent No.: US 7,959,337 B2
(45) Date of Patent: Jun. 14, 2011

(54) VEHICLE LIGHT AND METHOD

(75) Inventors: Susumu Nakamura, Tokyo (JP);
Takako Minoda, Tokyo (JP); Yasushi Kita, Tokyo (JP); Norikatsu Myojin, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 243 days.

(21) Appl. No.: 12/360,108

(22) Filed: Jan. 26, 2009

(65) Prior Publication Data
US 2009/0196061 A1 Aug. 6, 2009

(30) Foreign Application Priority Data
Jan. 25, 2008 (JP) ................................. 2008-014924

(51) Int. Cl.
*F21S 8/10* (2006.01)
(52) U.S. Cl. ........ 362/543; 362/507; 362/506; 362/544; 362/538
(58) Field of Classification Search .......... 362/506–507, 362/543–545, 538, 540, 505
See application file for complete search history.

(56) References Cited

U.S. PATENT DOCUMENTS

| | | | | |
|---|---|---|---|---|
| 5,215,369 A * | 6/1993 | Carolfi | ........................... | 362/506 |
| 5,692,824 A * | 12/1997 | Ooishi | ........................... | 362/505 |
| 6,406,172 B1 * | 6/2002 | Harbers et al. | ................. | 362/544 |
| 6,676,282 B2 * | 1/2004 | Begemann et al. | ........... | 362/543 |
| 7,226,193 B2 * | 6/2007 | Bahnmuller et al. | ......... | 362/465 |
| 7,758,221 B2 * | 7/2010 | Weijers | ........................ | 362/545 |
| 2001/0026451 A1 | 10/2001 | Hasumi et al. | | |
| 2006/0044818 A1 * | 3/2006 | Amagasa | ...................... | 362/514 |
| 2008/0212336 A1 * | 9/2008 | Chae | ............................. | 362/547 |

FOREIGN PATENT DOCUMENTS
JP 2001270382 10/2001
* cited by examiner

*Primary Examiner* — Robert May
(74) *Attorney, Agent, or Firm* — Kenealy Vaidya LLP

(57) ABSTRACT

A vehicle cornering light can improve the visibility in a diagonally front area of the vehicle without increasing the luminous intensity of the cornering light (or light source thereof). The cornering light that is provided at or near a front corner of a vehicle and is configured to emit light for illuminating a diagonally front area of the vehicle can include a light source that can emit light with a color temperature of from 3700K to 7000K. The cornering light can emit light for illuminating a lateral area ranging from 60° to 75° with respect to the longitudinal direction of the vehicle. The light source can be composed of a first light source configured to emit light for illuminating an area partly overlapping, or adjacent to, an illumination area of the headlight of the vehicle, and a second light source configured to emit light for illuminating an area partly overlapping, or adjacent to, the illumination area of the first light source. The color temperatures of the headlight, the first light source, and the second light source are sequentially changed to be higher in this respective order.

13 Claims, 11 Drawing Sheets

Conventional light source color

Light source color
w/ high visibility

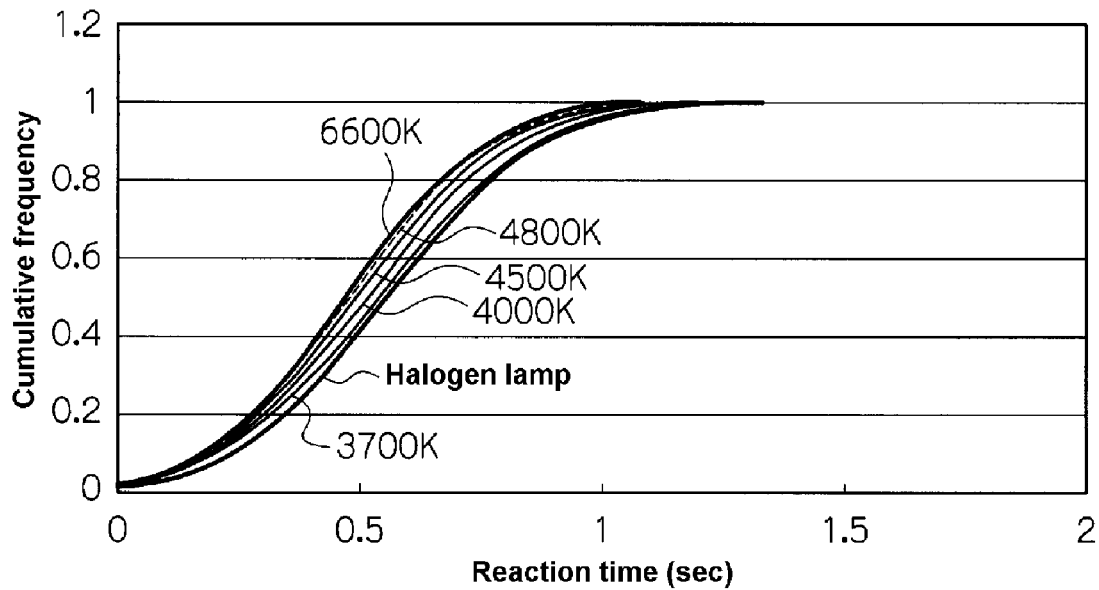
Fig. 8 Position of 30°
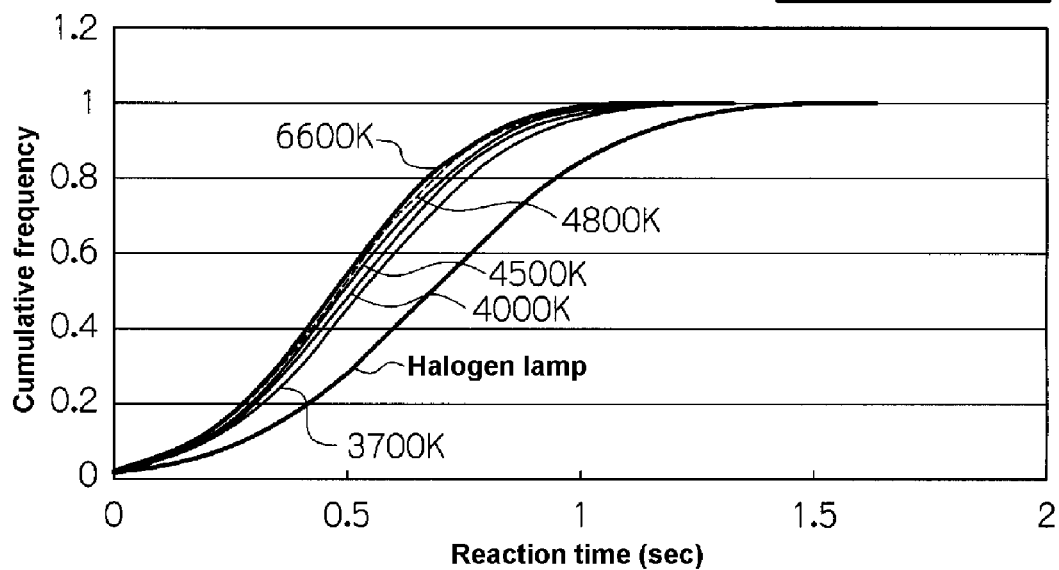
Fig. 9 Position of 45°

Position of 60°

Position of 75°

Fig. 12A
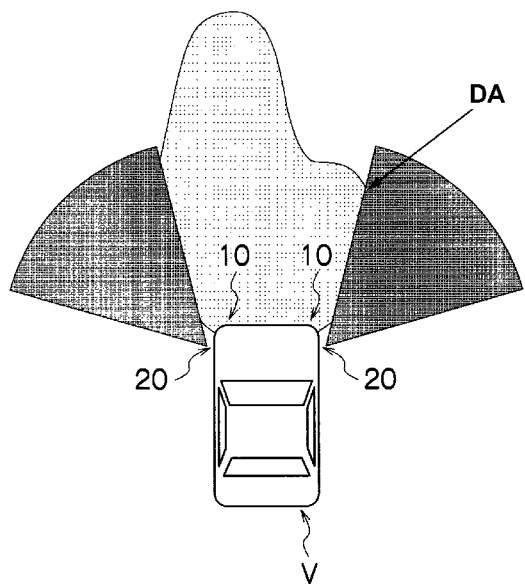
Fig. 12B
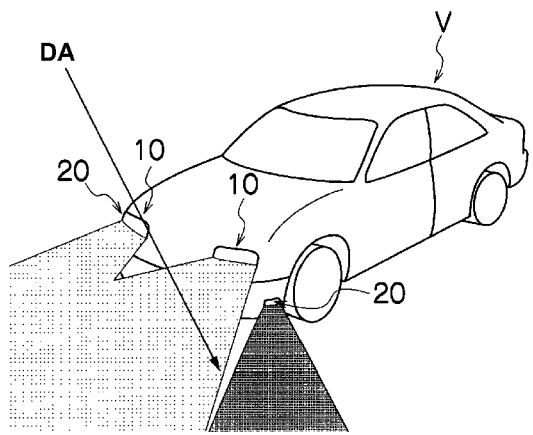
Fig. 13A
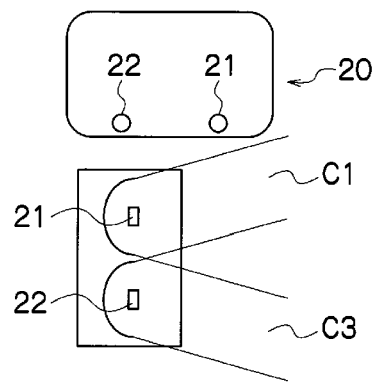
Fig. 13B
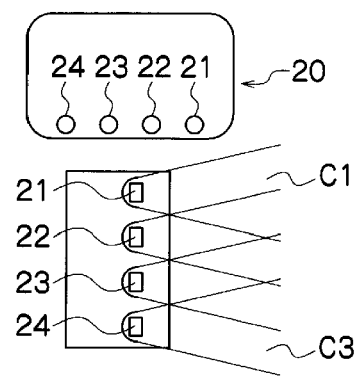
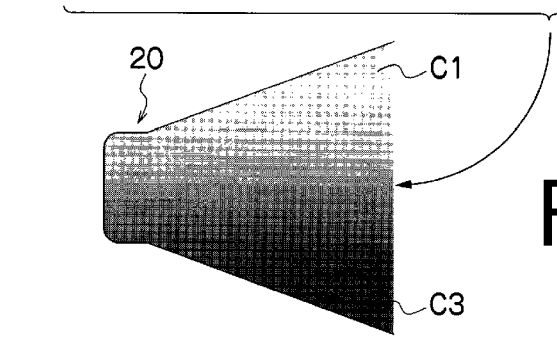
Fig. 13C

VEHICLE LIGHT AND METHOD

This application claims the priority benefit under 35 U.S.C. §119 of Japanese Patent Application No. 2008-014924 filed on Jan. 25, 2008, which is hereby incorporated in its entirety by reference.

BACKGROUND

1. Technical Field

The presently disclosed subject matter relates to a vehicle cornering light, and in particular to a vehicle cornering light that can improve the visibility in a diagonally front area of a vehicle.

2. Background Art

Vehicles such as automobiles have headlights on either side of the front part of the vehicle body in order to improve its forward visibility during night travel. Specifically, such a vehicle headlight is used to illuminate the area in front of the vehicle body. Accordingly, when such a vehicle is running along a curved road or turning right or left, the headlight of the vehicle might not effectively illuminate the area in the traveling direction. Namely, in the above-mentioned cases, the light beams from the headlight might not be projected toward the actual traveling direction of the vehicle. As a result, the visibility in the traveling direction of the vehicle may deteriorate.

For example, FIG. 1 shows the case where a vehicle V is turning right during night travel. In this case, the headlight cannot properly illuminate the area Ar from the right area to the right front area which is located in the traveling direction of the vehicle V. Accordingly, it would be difficult for the driver to visually confirm pedestrians P or the like (on the other hand, it would be also difficult for the pedestrians P to visually confirm the vehicle V). In particular, as the traveling direction of the vehicle just before it turns right (or the illuminated area) and the direction where the pedestrian walks (or the area to be illuminated) may not overlap each other, the light beams from the headlight might not illuminate the pedestrian and its peripheral proper area.

In order to address the above characteristics and/or problems, a cornering light can be provided in addition to the headlight as an auxiliary light (for example, see Japanese Patent Application Laid-Open No. 2001-270382).

The cornering light can be provided on both the front corners of the vehicle body (laterally of the headlight) in order to illuminate the diagonally front areas of the vehicle body which might not be covered by the headlight. The illumination range of such a cornering light can be a predetermined range around the directional center of 45° with respect to the front-to-rear (i.e., longitudinal) direction of the vehicle body, and the luminous intensity distribution over this range can be determined around this 45-degree direction as the center. In particular, the intensity distribution can be determined in the directions of 30° and 60° within a predetermined chromaticity range in accordance with a certain regulation (for example, see the graph shown in FIG. 7). Accordingly, the cornering light is configured to illuminate a required road surface area and the area in the traveling direction TD in accordance with certain regulations. This cornering light can project light beams onto a proper area in the traveling direction of the vehicle body when driving along a curved road or turning right or left, and therefore, the driver's visibility in the traveling direction can be ensured and improved (for example, see FIGS. 3A, 3B, and 4).

In general, such a cornering light can be configured to be turned on or off at one of the vehicle body corners in the traveling direction in association with the turning-on or off of a directional signal switch or the steering angle of a handle of the vehicle.

SUMMARY

Such a cornering light is provided in order to increase the luminous intensity of the road surface or its peripheral areas where a sufficient amount of light might not be projected only with the aid of the headlight when such a vehicle is running along a curved road or turning right or left. This configuration can improve the visibility at the road surface and its peripheral areas. In order to improve the visibility in the traveling direction of the vehicle and its peripheral areas, for example, where the pedestrian walks (or the area to be illuminated), when the vehicle turns right or left (the direction of peripheral vision), the luminous intensity of the cornering light can be regulated (increased).

However, when the luminous intensity of the cornering light (or light source thereof) is increased, a feeling of discomfort may be given to the drivers of oncoming vehicles or pedestrians, or a blind spot may be generated in accordance with the chromaticity or brightness of peripheral areas of the vehicle. Accordingly, such an arrangement can have disadvantages.

In view of the above-mentioned problems characteristics and features associated with the conventional art, the presently disclosed subject matter can include a vehicle cornering light which can improve the visibility in a diagonally front area of the vehicle without increasing the luminous intensity of the cornering light (or light source thereof).

The presently disclosed subject matter was devised in view of these and other problems characteristics and features associated with the conventional art. According to an aspect of the presently disclosed subject matter, a cornering light that is provided at or near a front corner of a vehicle and is configured to emit light for illuminating a diagonally front area of the vehicle can include a light source that can emit light with a color temperature of from 3700K to 7000K. In particular, the light source can be a semiconductor light source.

The inventors of the present application determined, as a cognitive reaction time, an elapsed time from when reflection light of a light source with various color temperatures and a uniform luminous intensity is presented to a test subject until the test subject perceives it. As a result, the inventors found that if a light source that can emit light with a high color temperature (between 3700K and 7000K inclusive) is used as a light source for use in a cornering light in place of an incandescent bulb or a halogen lamp (with a color temperature of around 2800K which is one of general purpose lamps), the test subject (or a driver) can perceive the reflection light earlier, meaning that the visibility can be improved further. In this case, the light source with light of a high color temperature may be a semiconductor light source such as an LED.

Based on this finding, the present inventors have completed the presently disclosed subject matter. Namely, use of a light source that can emit light with a color temperature of from 3700K to 7000K, as a light source for use in a cornering light, can improve the visibility in a diagonally front area of a vehicle without increasing the luminous intensity of the cornering light (or light source).

According to another aspect of the presently disclosed subject matter, the cornering light can emit light for illuminating a sideward area ranging from 60° to 75° with respect to the front-to-rear direction of the vehicle.

The inventors of the present application determined, as a cognitive reaction time, an elapsed time from when reflection light of a light source with various color temperatures and a uniform luminous intensity is presented to a test subject at respective predetermined angular positions (30°, 45°, 60°, and 75°) with respect to the forward direction of the vehicle until the test subject perceives it. As a result, the inventors found that when the light is presented at relatively large angular positions (for example, 60° and 75°) with respect to the forward longitudinal direction of the vehicle body, the test subject (or driver) can perceive it significantly earlier, meaning that the visibility can be improved.

Based on this finding, the present inventors have completed the presently disclosed subject matter. Namely, the cornering light can emit light for illuminating a lateral area ranging from 60° to 75° with respect to the forward longitudinal direction of the vehicle. This configuration can improve the visibility in the diagonally front area of the vehicle without increasing the luminous intensity of the cornering light (or light source).

According to still another aspect of the presently disclosed subject matter, the cornering light can include at least two or more light sources, each of which can emit light for illuminating an area partly overlapping, or being adjacent to, an illumination area of a headlight of the vehicle or the illumination area of the other light source. In addition, the light source that illuminates a more lateral area can emit light with a higher color temperature than the adjacent light source closer to the headlight. For example, the light source can be composed of a first light source configured to emit light for illuminating an area partly overlapping, or adjacent to, the illumination area of the headlight of the vehicle, and a second light source configured to emit light for illuminating an area partly overlapping, or adjacent to, the illumination area of the first light source. Furthermore, the color temperatures of the headlight, the first light source, and the second light source can be sequentially changed to be relatively higher with respect to each other and in this order.

In accordance with the presently disclosed subject matter, the color temperature (or chromaticity) of the illuminated light of the light source that can illuminate the area nearest to the area which the headlight can illuminate can be adjusted to be close to the color temperature of the illuminated light of the headlight. Furthermore, the color temperature of the adjacent illuminated light can be adjusted to the target color temperature, meaning that the illuminated light can be gradually changed to the target colored light. This configuration can remove the feeling of discomfort given to the drivers of oncoming vehicles or pedestrians, and can solve the problem associated with design.

In other words, according to still another aspect of the presently disclosed subject matter, a cornering light can be provided at or near a front corner of a vehicle and configured to emit light for illuminating a diagonally front area of the vehicle, with the vehicle including a headlight. In this configuration, the cornering light can include a light source configured to emit light with a predetermined color temperature higher than that of the headlight of the vehicle. This can improve the visibility in the diagonally front area of the vehicle without increasing luminance of the cornering light.

According to still another aspect of the presently disclosed subject matter, a vehicle headlight system can be provided, including: a headlight provided at a front of a vehicle and configured to emit light for illuminating a front area of the vehicle; and a cornering light provided at or near a front corner of the vehicle and configured to emit light for illuminating a diagonally front area of the vehicle, the cornering light comprising a light source configured to emit light with a color temperature of from 3700K to 7000K. This configuration can provide an improved headlight system exerting the above and below-mentioned advantageous effects.

The presently disclosed subject matter can provide a vehicle cornering light that can improve the visibility in a diagonally front area of the vehicle without increasing the luminous intensity of the cornering light (or light source thereof).

BRIEF DESCRIPTION OF THE DRAWINGS

These and other characteristics, features, and advantages of the presently disclosed subject matter will become clear from the following description with reference to the accompanying drawings, wherein:

FIG. 8 is a graph showing test results for evaluating the degree of perception in the case where a test subject can perceive reflection light from a light source presented at a position of 30° in accordance with principles of the presently disclosed subject matter;

FIG. 9 is a graph showing test results for evaluating the degree of perception in the case where a test subject can perceive reflection light from a light source presented at a position of 45° in accordance with principles of the presently disclosed subject matter;

FIGS. 12A and 12B are diagrams illustrating the situation where there may be a color temperature difference or a chromaticity difference (DA) between the illumination light from the headlight and that from the cornering light in accordance with principles of the presently disclosed subject matter;

FIG. 13A is a diagram illustrating a configuration example of another exemplary embodiment of a cornering light made in accordance with principles of the presently disclosed subject matter, FIG. 13B is a diagram illustrating another configuration example of another exemplary embodiment of a cornering light made in accordance with principles of the presently disclosed subject matter, and FIG. 13C is a diagram illustrating an illumination state (color change) of the cornering light configured in accordance with the presently disclosed subject matter.

DETAILED DESCRIPTION OF EXEMPLARY EMBODIMENTS

Figure 1:
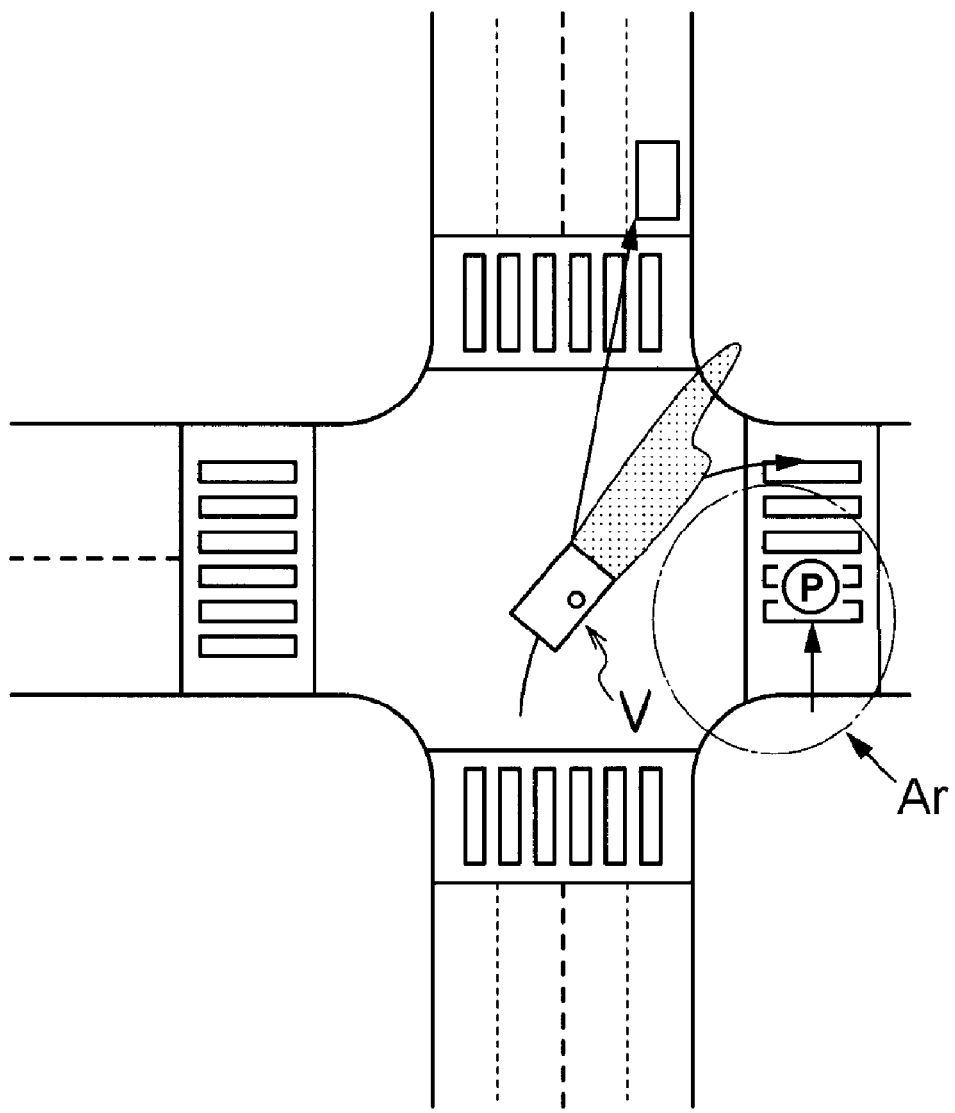
FIG. 1 is a diagram illustrating a conventional art device.
Figure 2:
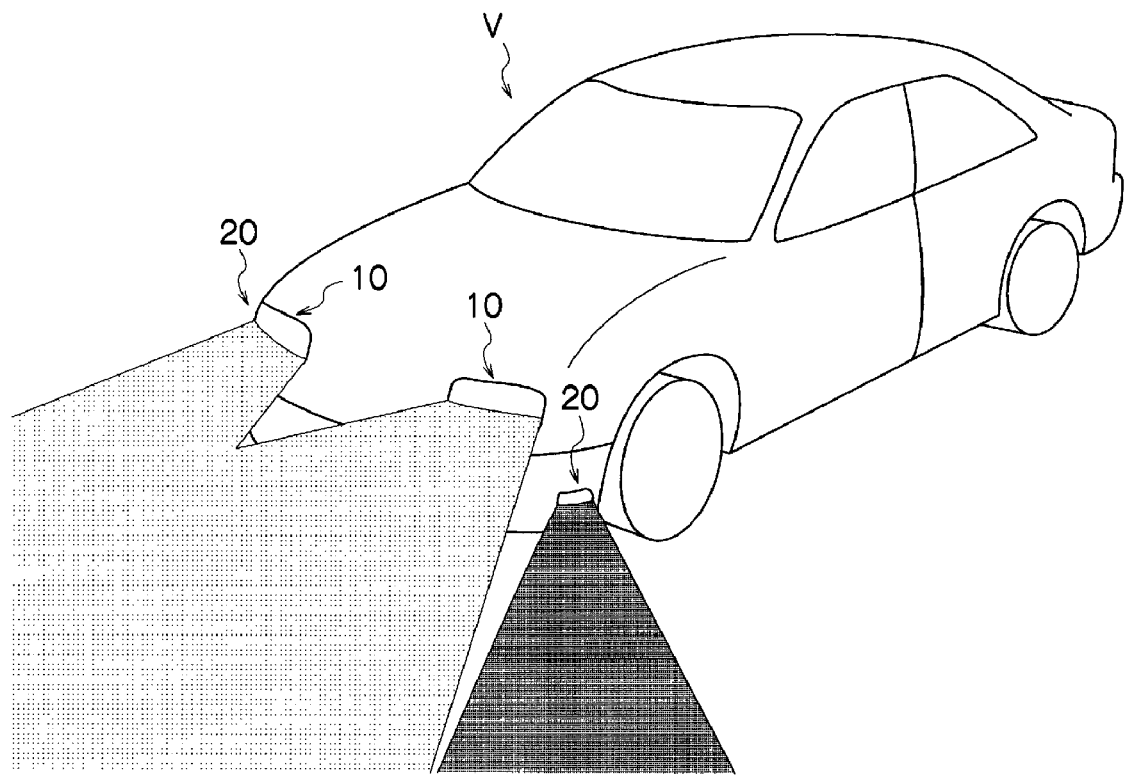
FIG. 2 is a diagram illustrating a vehicle V to which a first exemplary embodiment of a vehicle cornering light made in accordance with the principles of the presently disclosed matter is applied.

A description will now be made below to an exemplary vehicle cornering light made in accordance with principles of the presently disclosed subject matter and with reference to the accompanying drawings. FIG. 2 is a diagram illustrating a vehicle V to which a first exemplary embodiment of a vehicle cornering light made in accordance with the principles of the presently disclosed matter is applied.

As shown in FIG. 2, the vehicle V is an automobile. The vehicle V can include a headlight 10 provided at its front end and a cornering light 20 provided at either corner of the front end of the vehicle V.

The headlight 10 can emit light with a predetermined light distribution pattern in front of the vehicle V, and include a light source such as a halogen lamp. The cornering light 20 can emit light for illuminating a diagonally front area of the vehicle V, and include a white LED as a light source. The white LED can include a blue LED chip and a yellow phosphor material and have a high color temperature (in a range between 3700K and 7000K inclusive).

Figures 3A, 3B:
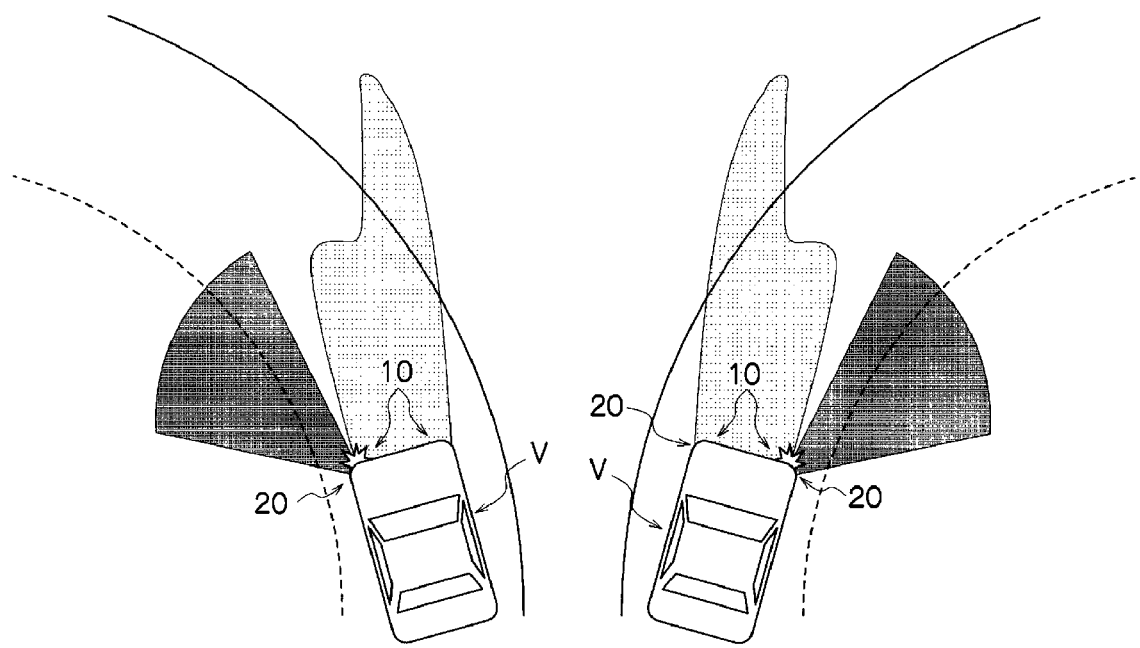
FIGS. 3A and 3B are diagrams illustrating a function of a cornering light when turning left (FIG. 3A) or right (FIG. 3B)
Figure 4:
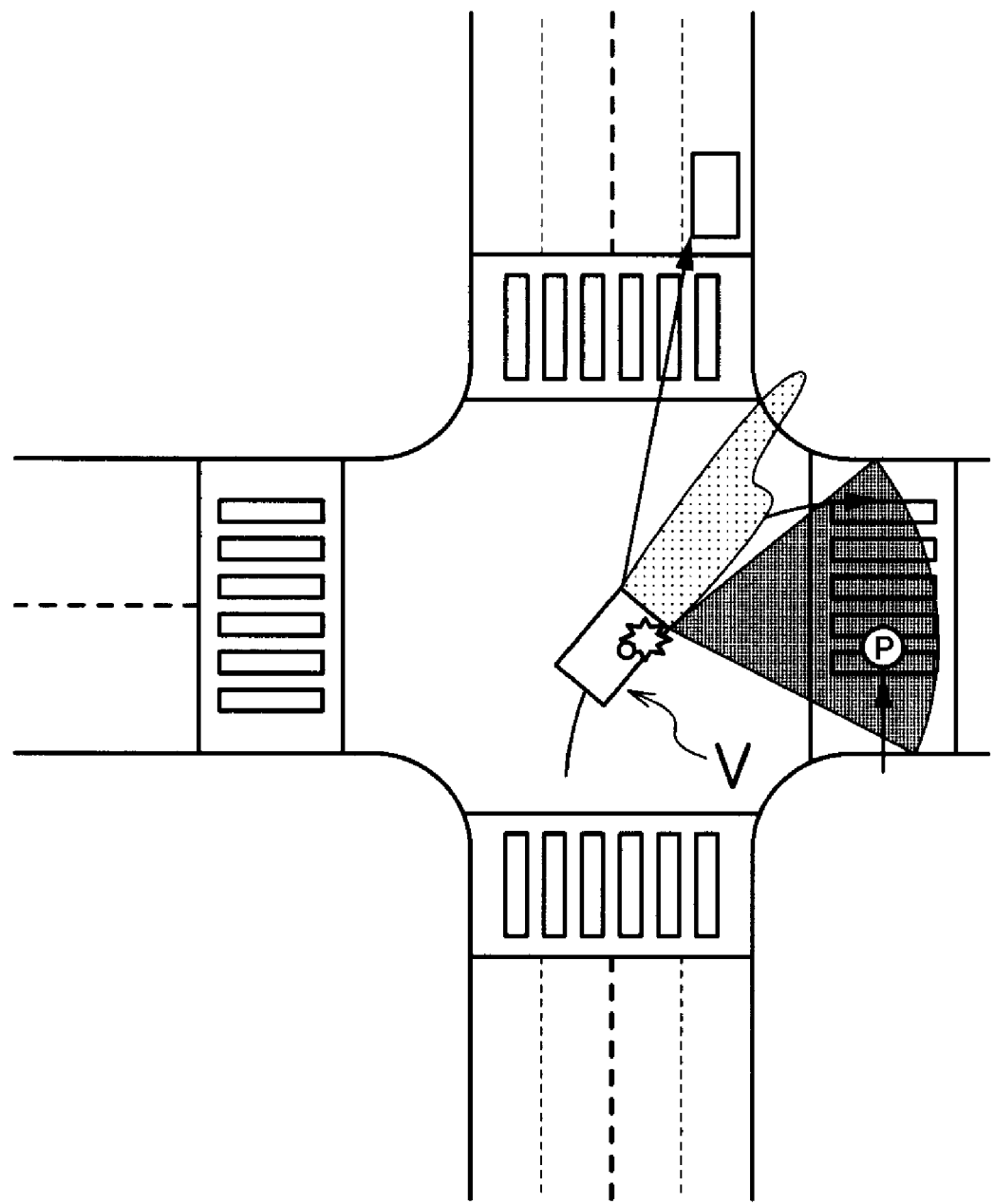
FIG. 4 is a diagram illustrating the function of the cornering light when turning right, where a pedestrian P is walking.

The cornering light 20 can project light along the traveling direction of the vehicle V when driving along a curved road or turning right or left, as shown in FIGS. 3A, 3B, and 4. This configuration can ensure the visibility of the driver in the traveling direction with reliably.

Figure 11:
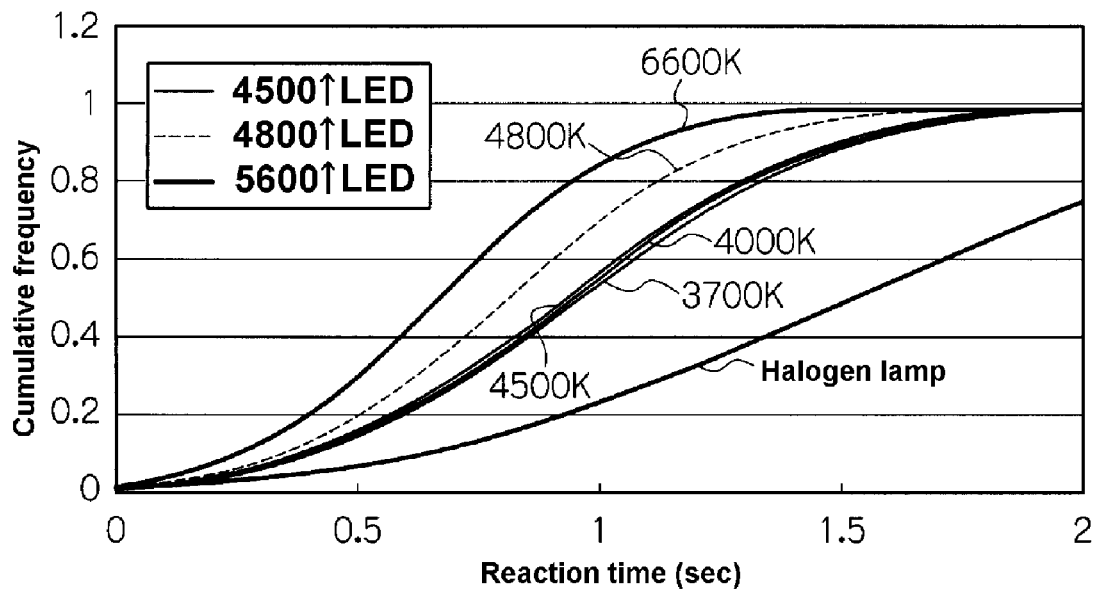
FIG. 11 is a graph showing test results for evaluating the degree of perception in the case where a test subject can perceive reflection light from a light source presented at a position of 75° in accordance with principles of the presently disclosed subject matter.

The inventors of the present application conducted the following experimental tests in order to determine a proper light source with desired performances for use in the cornering light of the presently disclosed subject matter. First, various light sources with various color temperatures (for example, as shown in FIG. 11, colors of 3700K, 4500K, 4800K, and 6600K) are prepared and the reflection light with a uniform luminous intensity from each of the light sources is presented to a test subject at a predetermined angular position. The inventors of the present application determined, as a cognitive reaction time, an elapsed time from when reflection light of a light source with various color temperatures and a uniform luminous intensity is presented to the test subject until the test subject perceives it. The shorter the reaction time, the higher visibility (or higher degree of perception wherein a test subject can perceive a presented light source) the light source can provide. As a result, the inventors found that if a light source that can emit light with a high color temperature (between 3700K and 7000K inclusive) is used as a light source for use in the cornering light 20 in place of a general-purpose incandescent bulb or halogen lamp (with a color temperature of around 2800K), the test subject (or a driver) can perceive the reflection light earlier, meaning that the visibility can be improved further in a predetermined diagonally front area of the vehicle V. In this case, the light source with light of a high color temperature may be a semiconductor light source such as an LED.

Figure 5A:
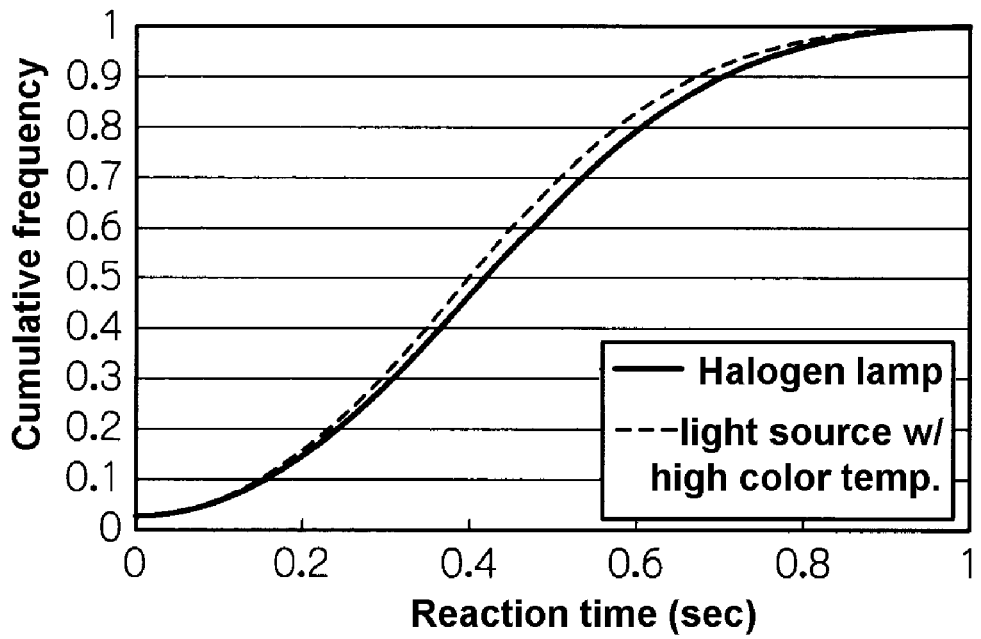
FIG. 5A is a graph showing test results for evaluating a degree of perception in the case where a test subject can perceive a presented light source, and in particular, the graph being prepared such that an elapsed time, from when reflection light of a light source with various color temperatures of 3700K or higher is presented to a test subject until the test subject perceives it, is determined as a cognitive reaction time, and a ratio of the number of the test subjects who can perceive the light at that elapsed time is calculated as a cumulative frequency (=(number of the test subjects)/(total number of the test subjects)), and the cumulative frequency is plotted as the number of cumulative frequency being an ordinate and the reaction time being an abscissa axis.
Figure 5B:
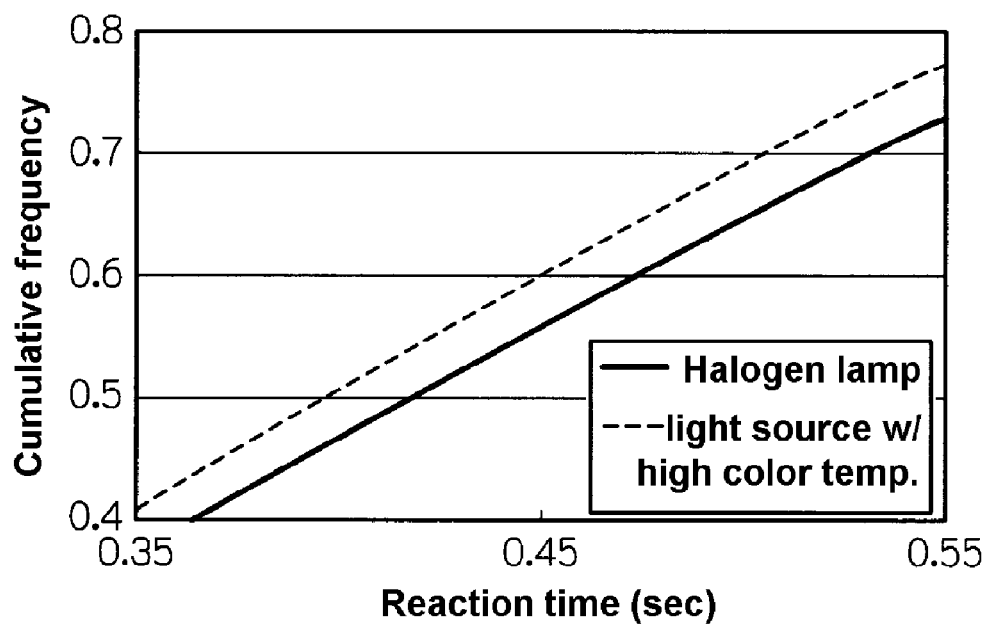
FIG. 5B is an enlarged view showing part of FIG. 5A around the area where the cumulative frequency is 0.5.

FIG. 5A is a graph showing test results for evaluating a degree of perception in the case where a test subject can perceive a presented light source. Specifically, an elapsed time, from when reflection light of a light source with various color temperatures of 3700K or higher is presented to a test subject until the test subject perceives it, is determined as a cognitive reaction time. Then, a ratio of the number of the test subjects who can perceive the light at that elapsed time is calculated as a cumulative frequency (=(number of the test subjects)/(total number of the test subjects)). Then, the cumulative frequency is plotted as the number of cumulative frequency being an ordinate and the reaction time being an abscissa axis in the graph. FIG. 5B is an enlarged view showing part of FIG. 5A around the area where the cumulative frequency is 0.5.

The curve shown in FIG. 5A is obtained by subjecting the calculated ratio (cumulative frequency) to normalization using a normal distribution function (Gaussian function). This means that the value of 1.0 in the ordinate represents the case where all of the test subjects can perceive the light. The ratio of 0.5 is assumed to be a threshold wherein the normal test subject perceives it.

With reference to FIGS. 5A and 5B, if a white LED that includes a blue LED and a yellow phosphor and can emit light with a high color temperature (between 3700K and 7000K inclusive) is used as a light source of the cornering light 20, it is clearly understood that the test subject (or a driver) can perceive the reflection light earlier when compared with an incandescent bulb, a tungsten lamp, or a halogen lamp (with a color temperature of around 2800K, which is one of general purpose lamps). It should be noted that if the color temperature of a light source exceeds 7000K, the light source may emit light containing a large amount of blue color component, resulting in the emission of bluish white light. This type of light color may not be advantageous for the cornering light.

Figure 6A:
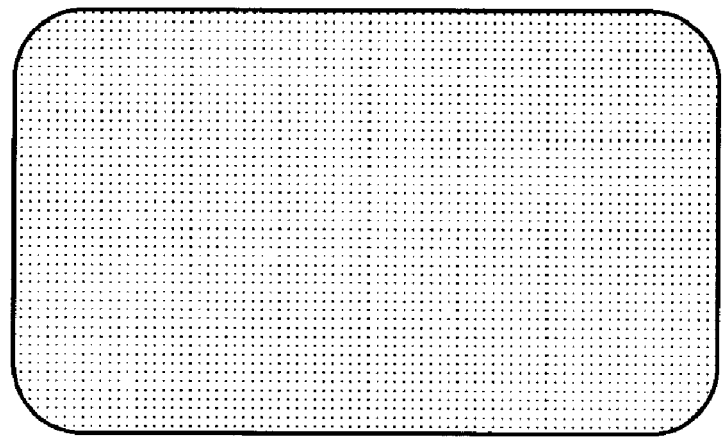
FIGS. 6A and 6B are schematic diagrams illustrating the difference between the color temperatures of light sources in accordance with principles of the presently disclosed subject matter.
Figure 6B:
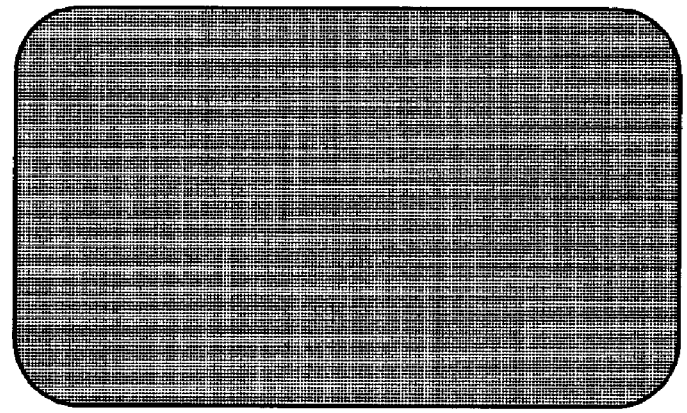
Figure 7:
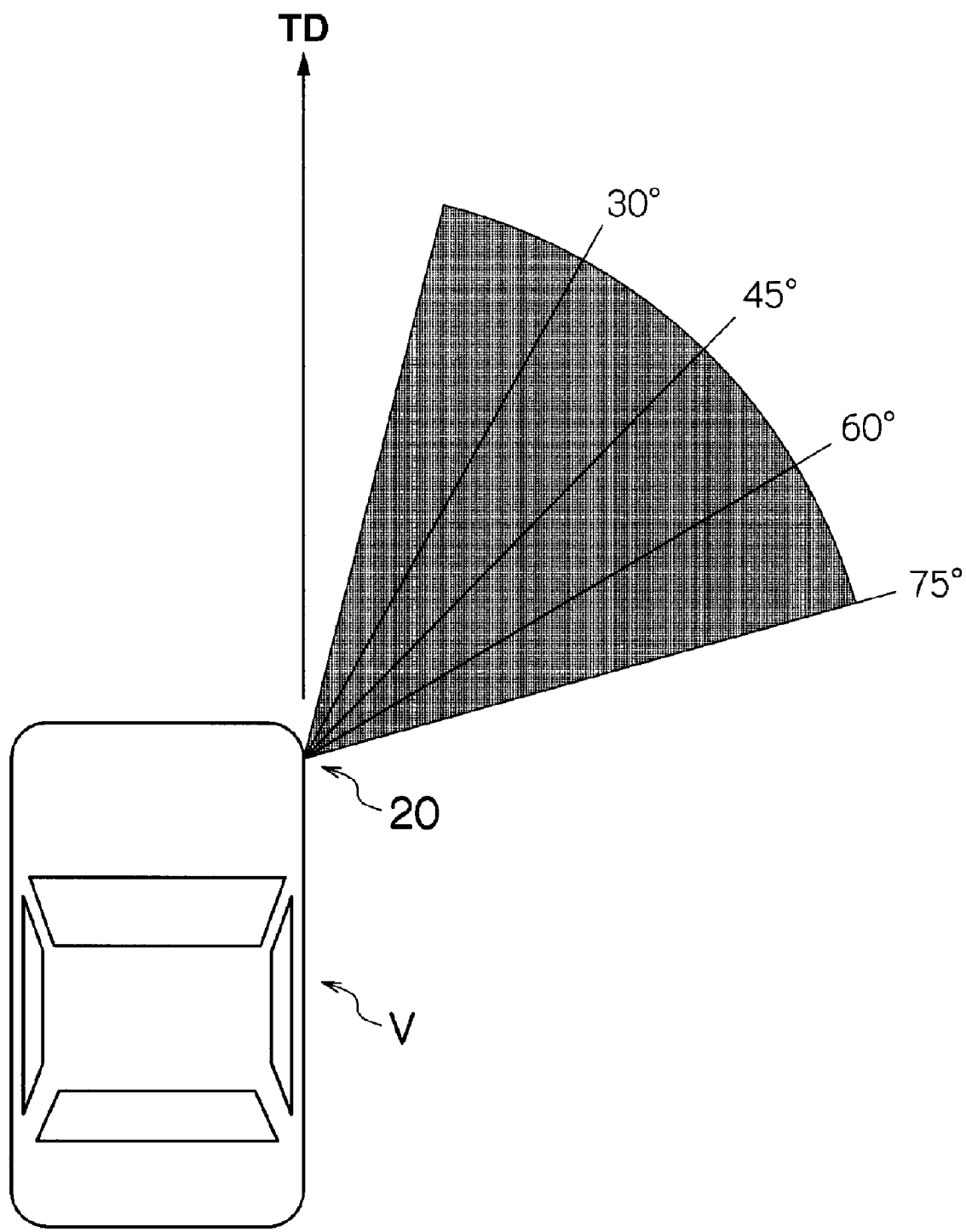
FIG. 7 is a diagram illustrating predetermined angular positions (30°, 45°, 60°, and 75°) with respect to the forward longitudinal direction of the vehicle (which direction can also be a traveling direction TD, direction of line of vision, or front direction) in accordance with principles of the presently disclosed subject matter.

As described above, use of an LED that can emit light with a high color temperature as a light source of the cornering light 20 in place of an incandescent bulb or a general-purpose halogen lamp (with a color temperature of around 2800K) can improve the degree of perception. It should be noted that the color temperatures can be in the range of from 3700K to 7000K inclusive, possibly in the range of from 4000K to 6600K inclusive, and possibly in the range of from 4800K to 6600K inclusive. The difference between such color temperatures can be represented by the images as shown in FIGS. 6A and 6B. FIG. 6A shows the image of the color of light sources used for a conventional cornering light, for example, an incandescent bulb or a halogen lamp showing a color of orange, or the like, whereas FIG. 6B shows the image of the color of light sources with high visibility showing a color of bluish white.

Next, the inventors of the present application conducted some experimental tests for evaluating the degree of perception of a test subject who perceives reflection light presented at respective predetermined sideward angular positions (30°, 45°, 60°, and 75°) with respect to the forward longitudinal direction of the vehicle V (being a traveling direction TD, direction of line of vision, or front direction). As a cognitive reaction time, an elapsed time from when reflection light of a light source with various color temperatures and a uniform luminous intensity is presented at respective predetermined laterally angular positions to a test subject until the test subject perceives it is determined. As a result, the inventors found that when the light is presented at relatively large angular positions (for example, 60° and 75°) with respect to the forward longitudinal direction of the vehicle V (being a traveling direction, direction of line of vision, or front direction), the test subject can perceive it significantly earlier, meaning that the visibility can be improved.

FIGS. 8 to 11 are graphs showing the test results for evaluating the degree of perception in the case where a test subject can perceive presented. Specifically, an elapsed time from when reflection light of a light source with a predetermined color temperature is presented to a test subject at respective predetermined sideward angular positions (30°, 45°, 60°, and 75°) with respect to the forward direction of the vehicle V (being a traveling direction, direction of line of vision, or front direction) until the test subject perceives it is determined as a cognitive reaction time. Then, a ratio of the number of the test subjects who can perceive the light at that elapsed time is calculated as a cumulative frequency (=(number of the test subjects)/(total number of the test subjects)). Then, the cumulative frequency is plotted as the number of cumulative frequency being an ordinate and the reaction time being an abscissa axis in the graph. The light sources used in the tests were LEDs with respective color temperatures of 3700K, 4000K, 4500K, 4800K, and 6600K and a halogen lamp. FIGS. 8, 9, 10, and 11 show the test results for evaluating the degree of perception at respective laterally angular positions of 30°, 45°, 60°, and 75° with respect to the forward direction.

Figure 10:
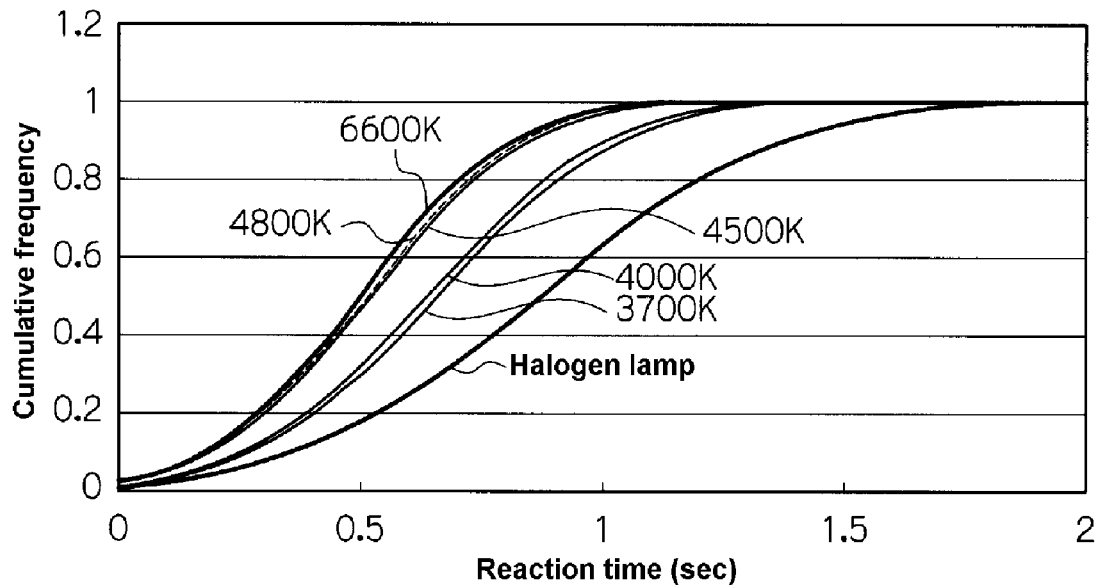
FIG. 10 is a graph showing test results for evaluating the degree of perception in the case where a test subject can perceive reflection light from a light source presented at a position of 60° in accordance with principles of the presently disclosed subject matter.

With reference to FIGS. 8 to 11, when the light is presented near the end of the field of view, there is a tendency wherein the test subject can perceive the light much later irrespective of the color temperature of the light source (in particular, refer to the results shown in FIGS. 10 and 11). On the other hand, there is a tendency wherein the test subject can perceive the light with higher color temperatures (light from LEDs with color temperatures of 3700K or higher) earlier (or a tendency wherein it is difficult for the test subject to perceive the light with lower color temperatures).

Accordingly, when a light source that can emit light with color temperatures of from 3700K to 7000K (in particular, a semiconductor light source) is used as the light source for use in the cornering light 20 so as to illuminate the sideward area ranging from 60° to 75° with respect to the front-to-rear direction of the vehicle V, this configuration can improve the visibility in the diagonally front area of the vehicle V (or the lateral area ranging from 60° to 75° with respect to the longitudinal direction of the vehicle) without increasing the luminous intensity of the cornering light 20 (or light source).

In view of this, a semiconductor light source that can emit light with higher color temperatures (of 3700K or higher) may be employed as the light source for use in the headlight 10. Such a semiconductor light source may also be employed in the cornering light 20 because an advantageous effect can be realized.

Here, suppose the case where such a semiconductor light source with higher color temperatures for illuminating the diagonally front area at a right or a left side of the vehicle is used for a cornering light 20. In this case, as shown in FIGS. 12A and 12B, there may be a chromaticity difference (DA) between the color temperature of the light emitted from the headlight 10 and that from the cornering light 20. In this case, the color temperature or chromaticity of the illuminated light may be abruptly changed in accordance with the direction of line of vision. This may provide a feeling of discomfort to the drivers of oncoming vehicles or pedestrians or may provide a disadvantageous design in terms of the illuminated area not being consistent during the nighttime driving.

Figure 14A:
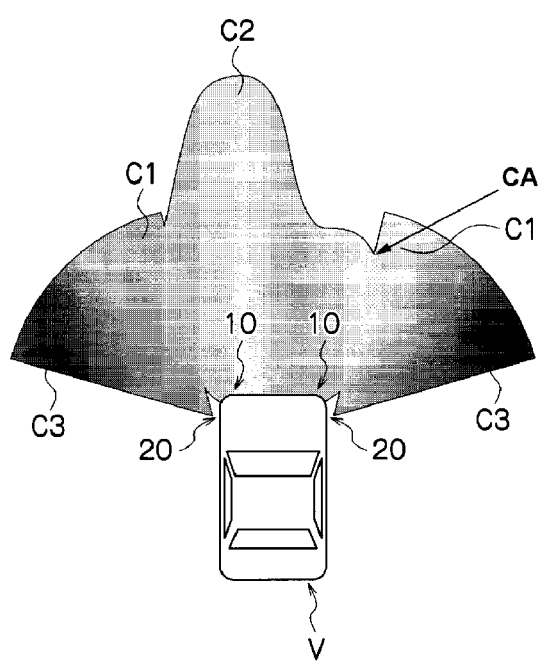
FIGS. 14A and 14B are diagrams illustrating a vehicle including the cornering light with the configuration shown in FIG. 13A or 13B, in particular illustrating the gradual change (CA) in color temperature or chromaticity between the illumination light from the headlight and the illumination light from the cornering light.
Figure 14B:
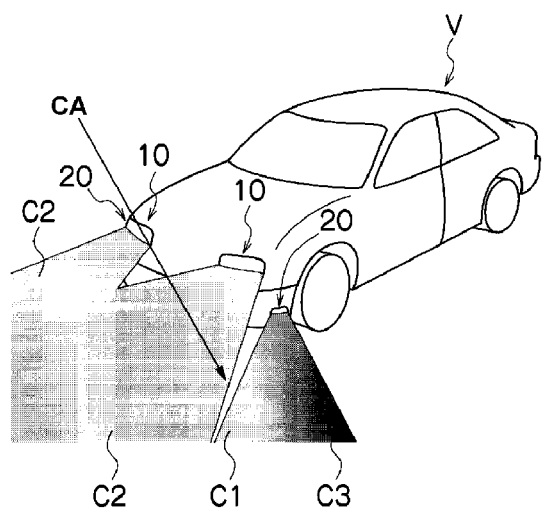

Taking this case into consideration, the cornering light 20 of the presently disclosed subject matter can include a plurality of light sources (LEDs) with different color temperatures as shown in FIGS. 13A and 13B or a reflector (not shown) specifically designed for such purposes. As shown in FIG. 13C and FIGS. 14A and 14B, the cornering light can emit light with gradually changing color temperatures (CA) from the area near the headlight illuminated area C2 to the cornering light illuminated areas C1 and C3 with the target color temperature (for example, of 3700K or higher).

Specifically, the cornering light 20 of FIG. 13A can include a first light source 21 configured to emit light for illuminating an area partly overlapping, or being adjacent to, an illumination area of the headlight 10 of the vehicle, and a second light source 22 configured to emit light for illuminating an area partly overlapping, or being adjacent to, the illumination area of the first light source 21. This cornering light 20 is configured such that the color temperatures of the headlight 10, the first light source 21, and the second light source 22 are sequentially changed to be higher in this order (namely, the color temperature of the first light source 21 is higher than that of the headlight 10, and the color temperature of the second light source 22 is higher than that of the first light source 21). Furthermore, the light sources can be disposed in the longitudinal direction of the vehicle V so that the illumination light beams emitted from the light sources can be positioned in this order.

FIG. 13B shows the modified example of the cornering light 20 of the above exemplary embodiment. Specifically, the cornering light 20 of FIG. 13B can include a first light source 21 configured to emit light for illuminating an area partly overlapping, or being adjacent to, an illumination area of the headlight 10 of the vehicle, a second light source 22 configured to emit light for illuminating an area partly overlapping, or being adjacent to, the illumination area of the first light source 21, a third light source 23 configured to emit light for illuminating an area partly overlapping, or being adjacent to, the illumination area of the second light source 22, and a fourth light source 24 configured to emit light for illuminating an area partly overlapping, or being adjacent to, the illumination area of the third light source 23. This cornering light 20 is configured such that the color temperatures of the headlight 10, the first light source 21, the second light source 22, the third light source 23, and the fourth light source 24 are sequentially changed higher in this order. Furthermore, the light sources 21-24 can be disposed in the longitudinal direction of the vehicle V so that the illumination light beams emitted from the light sources can be positioned in this order.

In accordance with the presently disclosed subject matter, the color temperature (or chromaticity) of the illuminated light of the cornering light 20 that can illuminate the area C1 nearest to the area where the headlight 10 can illuminate can be adjusted to be higher than, but close to the color temperature C2 of the illuminated light of the headlight 10 (for example, 2800K), as can be seen in FIGS. 13C, 14A, and 14B. Furthermore, the color temperature of the adjacent illuminated light can be adjusted to the target color temperature C3 (for example, 3700K or higher). This configuration can achieve the state wherein the illuminated light can gradually change to the target colored light (indicated by CA). Accordingly, this can remove the feeling of discomfort given to drivers of oncoming vehicles or pedestrians, and can solve the problem associated with design.

As described above, when a light source that can emit light with a high color temperature between 3700K and 7000K inclusive (possibly between 4000K and 6600K inclusive, and also possibly between 4800K and 6600K inclusive) is used as a light source for use in the cornering light 20 of the presently disclosed subject matter, the visibility in the diagonally front area of the vehicle V (in particular, at least the angular area of 60 to 75 with respect to the longitudinal direction of the vehicle, with reference to FIG. 4) can be improved without increasing the luminous intensity of the cornering light 20 (or light source).

In the above exemplary embodiments, the cornering light 20 configured to emit light for illuminating the diagonally front area of the vehicle can employ a white LED including a blue LED and a yellow phosphor and can produce light with a high color temperature (for example, 3700K or higher). However, the presently disclosed subject matter is not limited thereto. For example, the cornering light 20 can employ an LED that can emit three color RGB light with a high color temperature (for example, 3700K or higher), or other combinations of LEDs.

In the above exemplary embodiments, the cornering light 20 can include a plurality of light sources 21 to 24. However, the presently disclosed subject matter is not limited thereto. The cornering light 20 can contain only a single light source.

In the above exemplary embodiments, the drawings illustrate only the light source(s) and the peripheries thereof, but the drawings do not illustrate other parts of the cornering light. Although not shown in the drawings, the cornering light 20 of the presently disclosed subject matter can include, of course, a housing, a cover (or a cover lens), a projection lens, a reflector, a mounting device, a driving device, a controller, and the like vehicle lighting parts required in accordance with the intended applications and purposes.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

The invention claimed is:

1. A cornering light adjacent a front corner of a vehicle and configured to emit light for illuminating a diagonally front area forward of the vehicle, the cornering light comprising:
    a light source configured to emit light with a color temperature having a range of 3700K to 7000K, wherein
    the light source is composed of at least two cornering light sources, each of which is configured to emit light for illuminating an area at least one of partly overlapping and adjacent to at least one of an illumination area of a headlight of the vehicle and an illumination area of an other of the cornering light sources; and
    one of the at least two cornering light sources illuminates a more lateral area and emits light with a higher color temperature than a remaining one of the at least two cornering light sources, the remaining one of the at least two cornering light sources is located nearer to the headlight than the one of the at least two cornering light sources.

2. The cornering light according to claim 1, wherein the light source is a semiconductor light source.

3. The cornering light according to claim 1, wherein the light source is configured to emit light illuminating a lateral area having a range of 60° to 75° with respect to a longitudinal axis of the vehicle.

4. The cornering light according to claim 2, wherein the light source is configured to emit light illuminating a lateral area having a range of 60° to 75° with respect to a longitudinal axis of the vehicle.

5. A headlight system for use in a vehicle comprising:
    a headlight located adjacent a front of the vehicle and configured to emit light for illuminating a front area forward of the vehicle;
    a cornering light source located adjacent a front corner of the vehicle and configured to emit light for illuminating a diagonally front area forward of the vehicle, the cornering light source configured to emit light with a color temperature of from 3700K to 7000K; and
    a second cornering light source configured to emit light with a color temperature having a range of from 3700K to 7000K and greater than the color temperature of the cornering light source, wherein
    the cornering light source is located intermediate the headlight and the second cornering light source.

6. The vehicle headlight system according to claim 5, wherein:
    the headlight is configured to emit light in a headlight illumination area;
    the cornering light source is configured to emit light in a first illumination area that is one of adjacent to and partly overlapping the headlight illumination area; and
    the second cornering light source is configured to emit light in a second illumination area that is one of adjacent to and partly overlapping the first illumination area.

7. A method for illuminating a road surface that extends at an angle relative to a longitudinal axis of a vehicle comprising:
    providing a vehicle having the longitudinal axis, a headlight, and a cornering light source;
    emitting light from the vehicle headlight into a headlight illumination area, the light from the vehicle headlight having a headlight color temperature;
    emitting light from the cornering light source into a first illumination area that is one of adjacent to and partly overlapping the headlight illumination area, and wherein emitting light from the cornering light source includes emitting light from the cornering light source having a first color temperature that is greater than the headlight color temperature.

8. The method according to claim 7 further comprising:
    emitting light from the cornering light source into a second illumination area that is one of adjacent to and partly overlapping the first illumination area and having a second color temperature that is greater than the first color temperature.

9. The method according to claim 8, wherein emitting light from the cornering light source into a first illumination area includes emitting light having a first color temperature having a range of 3700K to 7000K, and emitting light from the cornering light source into a second illumination area includes emitting light having a second color temperature having a range of 3700K to 7000K, the second color temperature being greater than the first color temperature.

10. The method according to claim 7, wherein emitting light from the cornering light source into a first illumination area includes emitting light having a first color temperature having a range of 3700K to 7000K.

11. The method according to claim 7, wherein emitting the light in a first illumination area includes emitting light substantially centered about an angle relative to the longitudinal axis of the vehicle having a range of 60° to 75°.

12. A cornering light adjacent a front corner of a vehicle and configured to emit light for illuminating a diagonally front area forward of the vehicle, the cornering light comprising:
- a light source configured to emit light with a color temperature having a range of 3700K to 7000K;
- a headlight configured to emit light in an illumination area; and
- a second light source configured to emit light with a color temperature having a range of 3700K to 7000K and configured to emit light in a second illumination area,
- wherein the light source is configured to emit light in a first illumination area that is one of adjacent to and partly overlapping one of the second illumination area and the illumination area of the headlight of the vehicle,
- the light source is located intermediate the headlight of the vehicle and the second light source, and
- a color temperature of the second light source is greater than the color temperature of the light source.

13. A cornering light adjacent a front corner of a vehicle and configured to emit light for illuminating a diagonally front area forward of the vehicle, the cornering light comprising:
- a light source configured to emit light with a color temperature having a range of 3700K to 7000K;
- a second light source having a second color temperature, the second color temperature being greater than the color temperature of the light source;
- a third light source having a third color temperature, the third color temperature being greater than the second color temperature of the second light source;
- a fourth light source having a fourth color temperature, the fourth color temperature being greater than the third color temperature of the third light source, wherein
- the light source, the second light source, the third light source, and the fourth light source are spaced from each other and configured to illuminate more lateral areas of the vehicle with respect to each other and sequentially.

* * * * *